Oct. 12, 1971   ISAO HISHIKARI   3,611,806
RADIATION THERMOMETER
Filed July 28, 1969   2 Sheets-Sheet 1
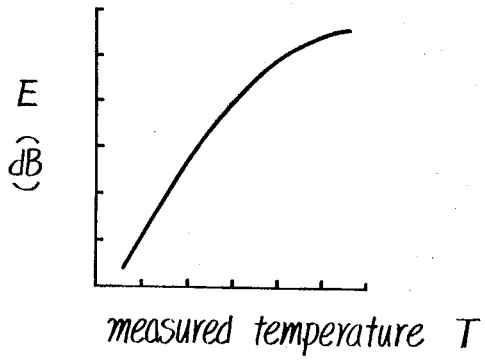
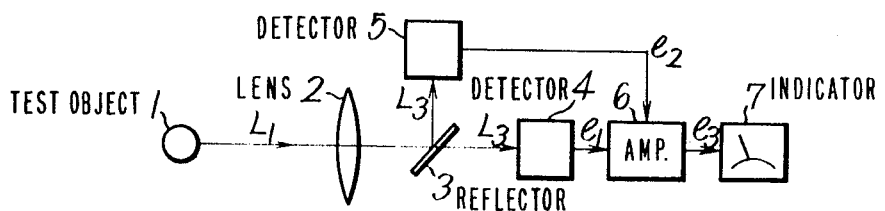
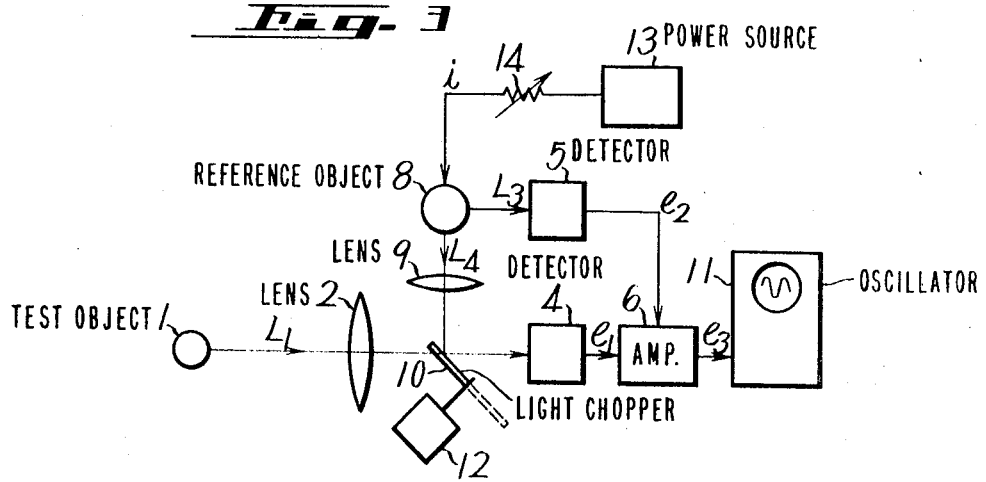
INVENTOR.
ISAO HISHIKARI
BY   ATTORNEYS

United States Patent Office 3,611,806
Patented Oct. 12, 1971

3,611,806
RADIATION THERMOMETER
Isao Hishikari, Tokyo, Japan, assignor to Kabushikikaisha Chino Seisakusho (Chino Works, Ltd.), Tokyo, Japan
Filed July 28, 1969, Ser. No. 845,421
Int. Cl. G01j 5/30, 5/52
U.S. Cl. 73—355 R                                      6 Claims

ABSTRACT OF THE DISCLOSURE

A radiation thermometer having means for detecting energy emitted from an object to be measured and generating electric signal corresponding to the energy, means for amplifying the electric signal, means for generating electric signal in accordance with the energy from the object, means for controlling gain of the amplifying means by the second mentioned electric signal, and means for indicating the temperature of the object by means of the output signal from the amplifying means.

BACKGROUND OF THE INVENTION

Field of the invention

The present invention relates to an apparatus which measures temperature of an object by converting thermal radiation energy emitted from the object to the corresponding electric signal, and more particularly to a radiation thermometer in which the gain of an amplifier system used in the radiation thermometer for the electric signal is varied in connection with the temperature of the object to be measured.

Description of the prior art

In general, energy emitted from the surface of an object is not varied linearly in accordance with the change of the surface temperature of the object. Accordingly, in the case where the energy emitted from the surface of the object is converted into the corresponding electric signal by means of a detector having a spectral sensitivity in a predetermined wavelength range, the relationship between the measured temperature and the electric signal obtained from the detector is shown in FIG. 1 in which the abscissa represents the measured temperature T in degree and the ordinate the electric output E in db. That is, as apparent from the figure (or graph), the electric output E is approximately increased exponentially in accordance with the increase of the temperature T. Since, in practice, the electric output thus obtained is very small, it is conventional to provide an amplifier of high gain in a pyrometer for operating an indicator. The amplifier used in the conventional pyrometer has the characteristics that the relationship between an input and an output is substantially linear so that the conventional pyrometer has the disadvantage that its indication sensitivity differs in accordance with the variation of the temperature to be measured, because the input signal to the amplifier changes exponentially with temperature variation as set forth above.

Further, the conventional pyrometer also has the disadvantage that its temperature measuring range is substantially limited and/or that its amplifier system is apt to be unstable in the high temperature range.

In the prior art, in order to avoid such disadvantages an amplifier having non-linear characteristics is employed or an A.G.C. circuit is provided which automatically controls the gain of an amplifier used in accordance with the magnitude of the output obtained from the amplifier. However, in such a case the gain of the amplifier is varied by fluctuations of the electric power source and variations of ambient temperature so that it is almost impossible to keep the gain linear over the temperature range to be measured.

SUMMARY OF THE INVENTION

The present invention relates to a radiation thermometer which can maintain the gain of an amplifier substantially linear over a temperature range to be measured and has substantially constant indication sensitivity for a wide range of the temperature.

BRIEF DESCRIPTION OF THE DRAWINGS

FIG. 1 is a graph for explaining the present invention;
FIG. 2 is a block diagram showing an embodiment of the present invention;
FIG. 3 is a block diagram illustrating another embodiment of the present invention.

DESCRIPTION OF THE PREFERRED EMBODIMENTS

Figure 4:
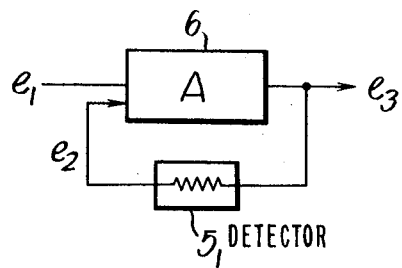
FIGS. 4 and 5 are connection diagrams, each illustrating one part of the amplifier used in the present invention.

The embodiment shown in FIG. 2 shows the present invention applied to an apparatus in which temperature is directly measured by an electric signal from a detector. In FIG. 2, reference numeral 1 designates an object the temperature of which is to be measured. Reference character $L_1$ represents energy radiated from the surface of the object 1. This energy $L_1$ is converged by a convergent lens such, for example, as convex lens 2 and then is applied to a prism or half mirror 3. The half mirror 3, for example, divides the converged energy $L_1$ into energy components $L_2$ and $L_3$. One of the energy component, $L_2$ is supplied to a measuring detector 4 which converts the energy $L_2$ into a corresponding electric signal $e_1$. The other energy component $L_3$ is supplied to a controlling detector 5 which produces an electric control signal $e_2$. This control signal $e_2$ is utilized for controlling the gain of an amplifier 6 which will be explained below.

The measuring detector 4 includes a photoelectric conversion element such, for example, as a photoconductive cell make of PbS and a photoelectric element of Si such as is known to the art. The controlling detector 5 also comprises a photoconductive cell made of CdS or the like and generates the electric control signal $e_2$ the magnitude of which varies as an exponential function of the temperature to be measured.

The control signal $e_1$ is amplified by the amplifier 6. The gain of the amplifier 6 is controlled by the control signal $e_2$ so that the gain is exponentially decreased as an inverse function of the exponential increase of the input signal $e_1$ caused of the increase of the temperature of the object to be measured. Thus, the amplifier 6 generates an output signal $e_3$ which changes substantially linearly with changes of the temperature of the object 1 because the gain at amplifier 6 is controlled linearly as a function of temperature. The output signal $e_3$ from the amplifier 6 is applied to, for example, a temperature indicator 7 which has an indicator needle that may be read against a linear scale.

FIG. 4 shows a practical embodiment of the controlling detector 5 which controls the gain of the amplifier 6 with the control signal $e_2$. The detector 5 includes a photoconductive element $5_1$ such as CdS element which is inserted into the feedback circuit of the amplifier 6. The photoconductive element $5_1$ is inserted in such a manner that it receives one energy component $L_3$ from the energy $L_1$ radiated from the object 1. When the element $5_1$ receives the energy $L_3$, its electrical resistance is exponentially increased or decreased as a function of the temperature decrease or increase and the gain of the amplifier 6 is changed exponentially. The gain will be decreased with an increase of the temperature to be measured and the gain is increased with a decrease of temperature.

Figure 5:
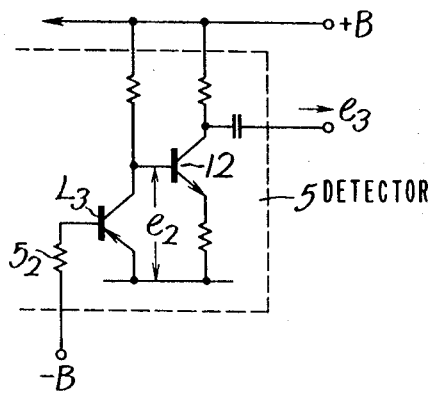

FIG. 5 shows another example of the detector 5 in which is a phototransistor $5_2$ is employed as a photoelectric conversion element. In this example, the phototransistor $5_2$ receives the energy component $L_3$ and is connected into the circuit between the base and emitter of a transistor 12 included in the output stage of the amplifier 6 so that the mu-factor of the transistor 12 can be controlled by the output signal $e_2$ delivered from the phototransistor $5_2$.

FIG. 3 illustrates another example of the present invention in which similar references designate similar elements in FIG. 2 example. In this example, the temperature of the object 1 is indirectly measured by comparing the radiation energy from the object with radiation energy from a reference body or variable comparison radiation body the surface temperature of which is known.

The example shown in FIG. 3 will be explained in detail. The radiation energy $L_1$ from the object 1, the temperature of which is to be measured, is converged by the lens 2, while radiation energy $L_4$ from a reference or comparison body such as a tungsten-filament lamp 8 is converged by a convex lens 9. Thus converged radiation energies $L_1$ and $L_4$ are alternatively supplied to the measuring detector 4 through a light chopper 10. The dector 4 provides an electrical signal having an A.C. component $e_1$ with an amplitude which corresponds to the difference between the energies $L_1$ and $L_4$. The A.C. component $e_1$ is supplied to the A.C. amplifier 6 and amplified. One component $L_3$ of the energy from the reference body 8 is supplied to the controlling detector 5 which provides a D.C. control signal $e_2$ corresponding to the energy $L_3$. The magnitude of the signal $e_2$ is approximately an exponential function of the surface temperature of the reference body 8. The means for controlling the gain of the amplifier 6 with the control signal $e_2$ is substantially same as that in the FIG. 2 example. In this example, the A.C. component $e_1$ is amplified by the amplifier 6 and the A.C. output $e_3$ delivered from the amplifier 6 is then applied to an oscilloscope 11 for presentation. The reference body 8 receives electrical power is supplied through a variable resistor 14 from an electric power source 13.

In operation, lamp current $i$ is supplied from the power source 13 to the reference body (tungsten-filament lamps) 8 and is controlled by adjusting the variable resistor 14 to adjust the brightness of the lamps 8 so that the amplitude of the A.C. output signal $e_3$ becomes substantially zero. The amplitude of the signal $e_3$ is observed on the oscilloscope 11. The temperature of the object 1 is thus measured against the surface temperature of the lamp 8. In this case, the gain of the amplifier 6 is automatically controlled as an exponential function of the surface temperature of the reference body (lamp) 8 as above.

A photoelectric element of CdS can be employed as a photoelectric conversion element in the measuring detector 4 and a CdS element of high sensitivity for high temperature can be employed as a photoelectric conversion element in the controlling detector 5. When the temperature of the object 1 to be measured is relatively low, an optical filter (not shown) is interposed between the reference body 8 and the optical chopper 10 to decrease the energy transmitted to the detector 4 from the reference body (lamp) 8, while relatively high energy levels are applied to the photoelectric conversion element of the detector 5. As a result, the detector 5 can provide relatively large control signals $e_2$ to effectively control the gain of the amplifier 6, even when the temperature of the object 1 is low.

According to the present invention, the relationship between the temperature to be measured and the gain of the amplifier system used therein can be maintained substantially linear independent of the temperature to be measured. The sensitivity or the discrimination sensitivity between the temperatures of the reference body and the test object is maintained substantially constant. Thus, a radiation thermometer having stable indication and discrimination characteristics is practical. Also, the apparatus of the present invention can measure temperature over a wide range.

I claim as my invention:

1. A radiation thermometer for measuring the temperature of a test object comprising, a lens receiving and passing radiant energy emitted by said test object, a first means receiving a first portion of said radiant energy and generating a first electrical signal proportional to said first portion of energy, an amplifier with controllable gain receiving said first electrical signal, a second means receiving a second portion of said radiant energy and generating a second electrical signal proportional to said second portion of energy and supplying said second electrical signal to said amplifier to control its gain, and means for indicating temperature connected to the output of said amplifier and said first and second portions of energy having the same frequency distribution, said second means having a frequency response identical to that of said first means.

2. A radiation thermometer according to claim 1 comprising a partially silvered mirror mounted between said lens and said first and second receiving means to divide said radiant energy into said first and second portions.

3. A radiation thermometer for measuring the temperature of a test object comprising a lens receiving radiant energy from said test object, a first means receiving a first portion of said radiant energy and generating a first electrical signal proportional to said first portion of energy, an amplifier with a controllable gain receiving said first electrical signal and generating a second electrical signal, a photoelectric means receiving a second portion of said radiant energy and its impedance varied thereby, said photoelectric means connected between the output of said amplifier and an input of said amplifier to control its gain and said first and second portion of energy having the same frequency distribution.

4. A radiation thermometer for measuring the temperature of a test object comprising, a reference source, a first means for generating a first electrical signal as a function of radiant energy received, means for alternately passing radiant energy from said test object and said reference radiation source to said first means, an amplifier with variable gain receiving said first electrical signal producing a second electrical signal, a second means for generating a third electrical signal as a function of radiant energy and receiving radiant energy from said reference radiation source and supplying said third electrical signal to said amplifier to vary its gain and indicator means receiving said second electrical signal from said amplifier.

5. A radiation thermometer according to claim 4 wherein said reference radiation source includes a tungsten filament lamp.

6. A radiation thermometer according to claim 5 wherein said reference radiation source includes a variable impedance and a power supply connected in circuit with said lamp.

References Cited

UNITED STATES PATENTS

| | | | |
|---|---|---|---|
| 2,302,554 | 11/1942 | Kingsbury | 356—43 |
| 3,264,931 | 8/1966 | Ackerman et al. | 73—355 X |
| 3,354,773 | 11/1967 | Shreve | 73—355 X |
| 3,435,237 | 3/1969 | Collins | 73—355 X |
| 3,454,769 | 7/1969 | Dynes | 73—355 X |

LOUIS R. PRINCE, Primary Examiner

FREDERICK SHOON, Assistant Examiner

U.S. Cl. X.R.

356—43, 46